United States Patent [19]
Ito

[11] Patent Number: 5,850,687
[45] Date of Patent: Dec. 22, 1998

[54] MACHINE AND A METHOD FOR DRIVING INSERTS INTO PIECES OF SHEET METAL

[75] Inventor: Katsuhide Ito, Turin, Italy

[73] Assignee: Amada America, Inc., Buena Park, Calif.

[21] Appl. No.: 613,171

[22] Filed: Mar. 8, 1996

[30] Foreign Application Priority Data

Mar. 10, 1995 [IT] Italy .................................. T095A0184

[51] Int. Cl.[6] .................................................... B23P 19/04
[52] U.S. Cl. ........................ 29/818; 29/243.5; 29/281.3; 29/281.4; 29/281.5; 29/798
[58] Field of Search .............. 29/430, 771, 787, 29/788, 790, 795, 796, 798, 818, 281.5, 283, 243.5, 281.3, 281.4

[56] References Cited

U.S. PATENT DOCUMENTS

| | | |
|---|---|---|
| 3,452,418 | 7/1969 | Ernest et al. . |
| 3,465,410 | 9/1969 | Ernest et al. . |
| 3,504,424 | 4/1970 | Brown . |
| 3,699,628 | 10/1972 | Gollobitz . |
| 3,751,794 | 8/1973 | Kay . |
| 3,766,627 | 10/1973 | Headman ........................... 29/281.3 X |
| 4,885,836 | 12/1989 | Bonomi et al. ........................ 29/524.1 |

OTHER PUBLICATIONS

*The History of the Auto–Sert Press*, Auto–Sert, Inc., Minneapolis, Minnesota, May 1993.

"Hardware Inserting Press Comparison Notes", Auto–Sert, Inc., Minneapolis, Minnesota, Apr. 1993.

Brochures for Auto–Sert AS 7.5 Press, Auto–Sert, Inc., Minneapolis, Minnesota.

Brochure for "Pemserter Series 1000: 8–Ton Automatic Press System", Penn Engineering & Manufacturing Corp., Danboro, Pennsylvania, 1990.

"Self–Clinching Fasteners Improve Assembly Process", Leon M. Attarian, MAN Magazine, Apr. 1994.

Brochure for Haeger 824 Press, Haeger, Inc., Oakdale, California.

*Primary Examiner*—Joseph M. Gorski
*Attorney, Agent, or Firm*—Greenblum & Bernstein, P.L.C.

[57] ABSTRACT

A machine for driving inserts into pieces of sheet metal includes a punch and a die movable relative to one another along an axis along which the inserts are to be driven. The punch and die define a driving zone therebetween, in which a hole in the piece in which an insert is to be driven is positioned. The axis along which the inserts are to be driven is substantially horizontal and the pieces are held in a substantially vertical plane by an automatic handling device.

14 Claims, 8 Drawing Sheets

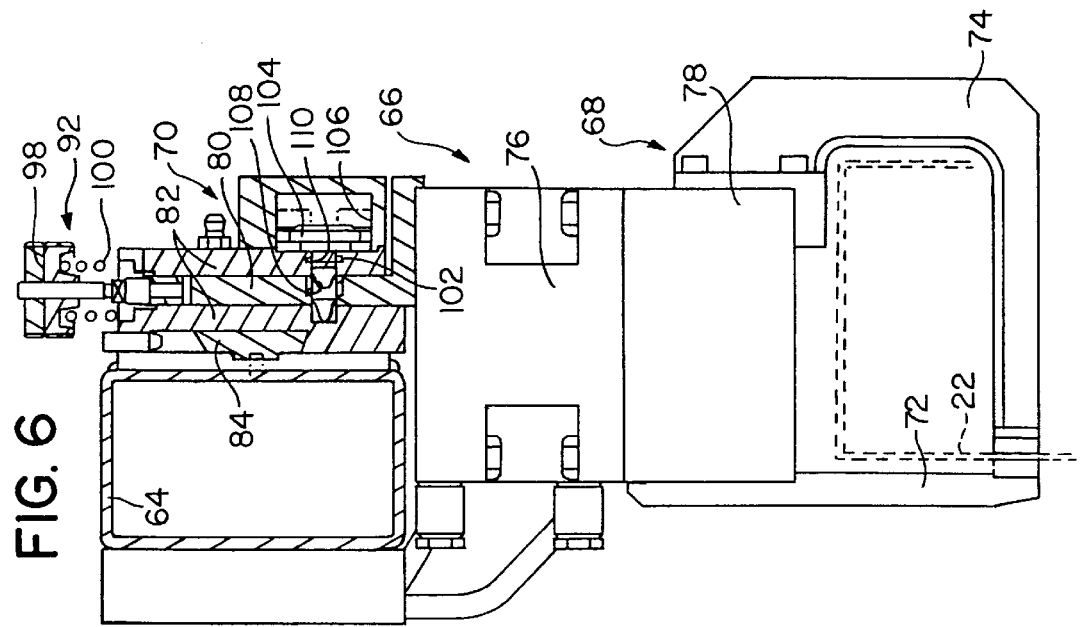
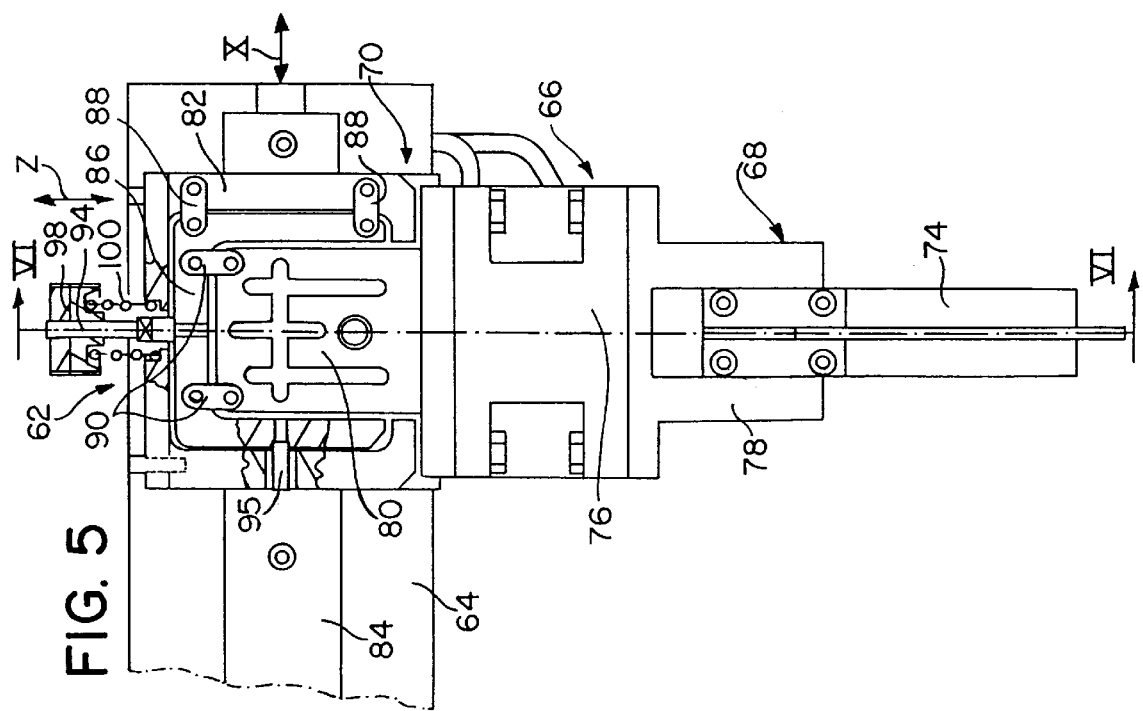

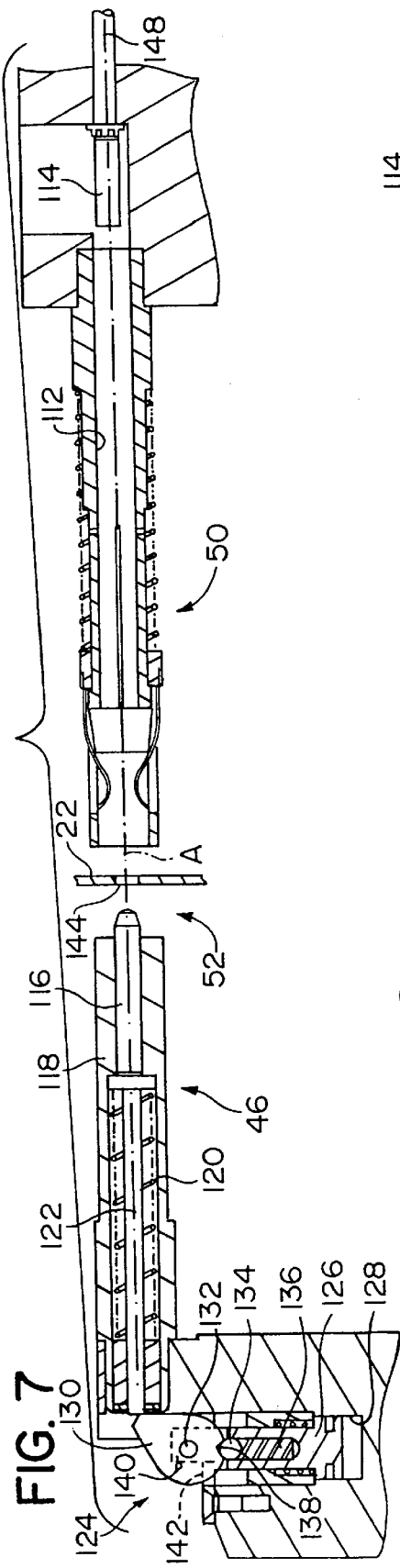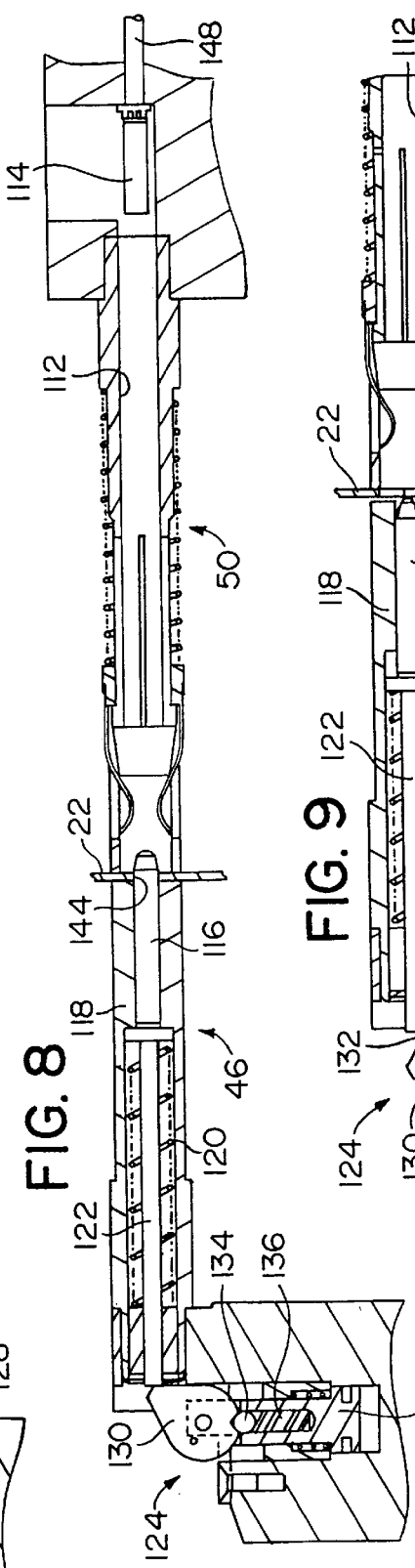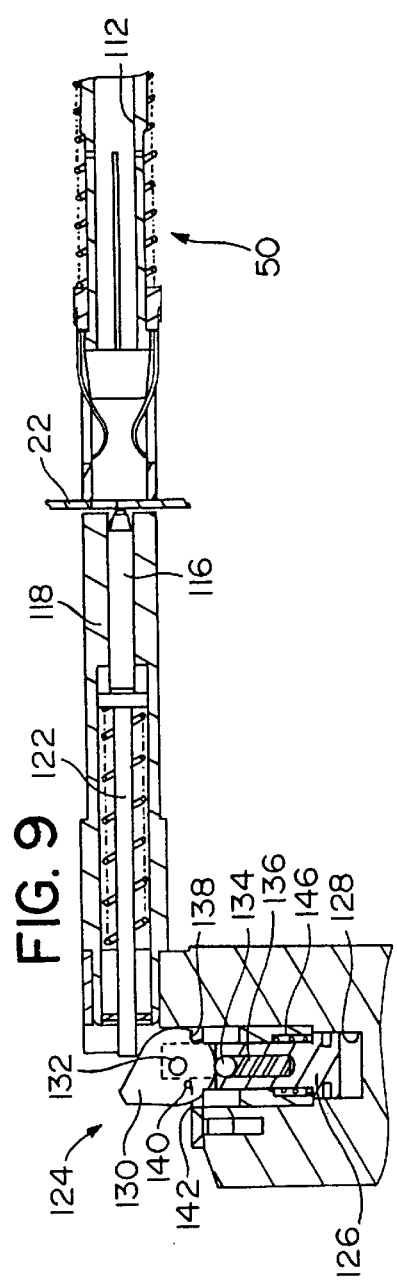

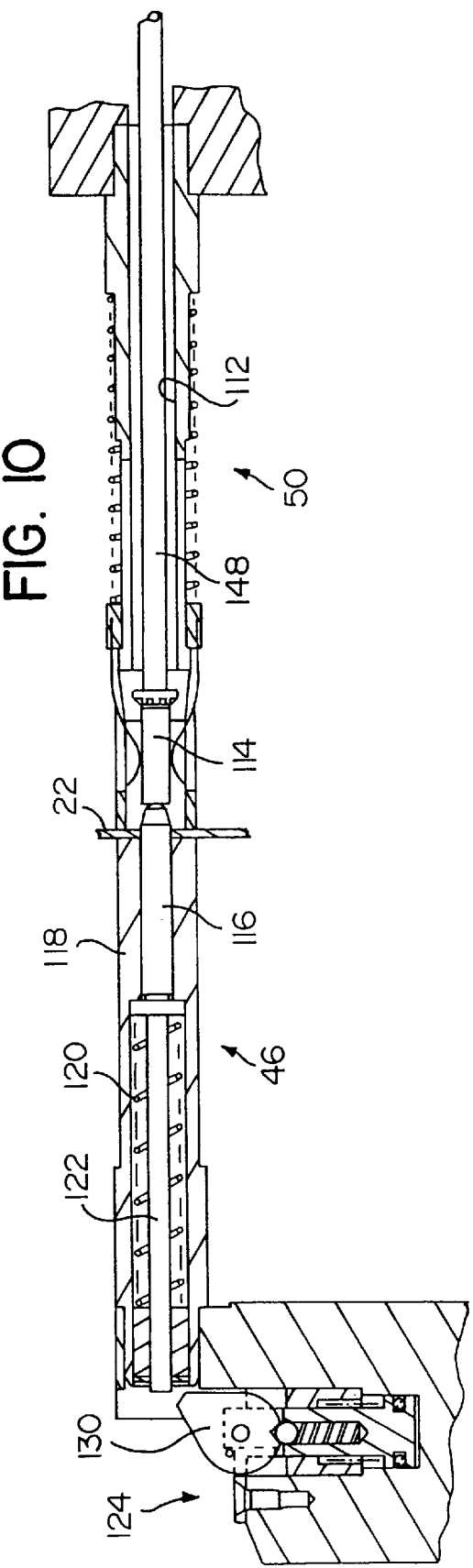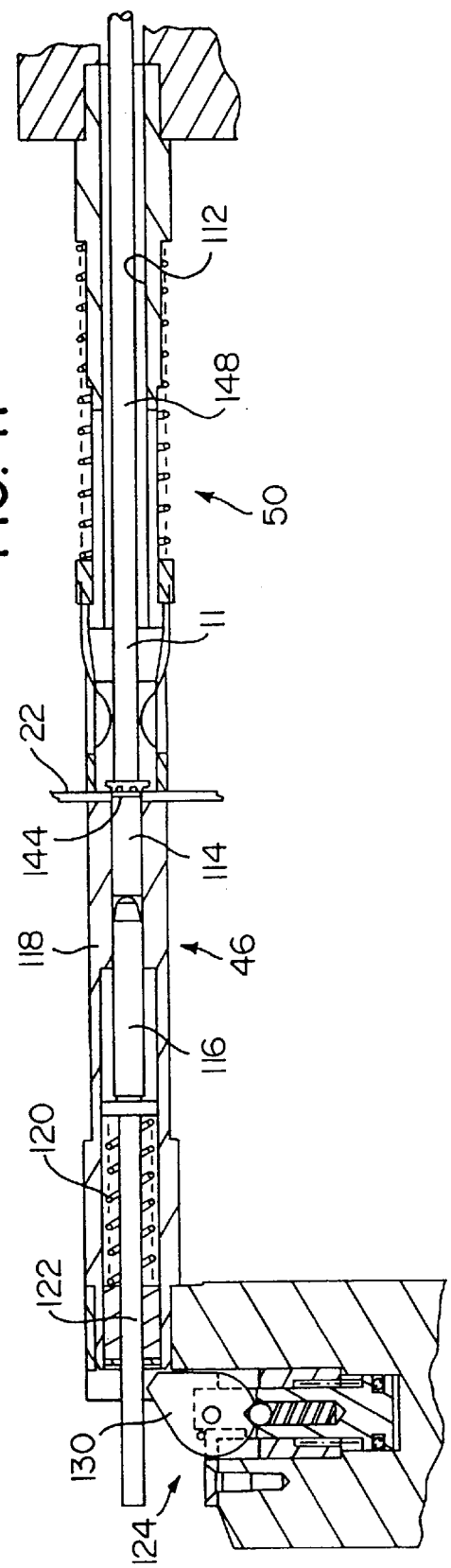

MACHINE AND A METHOD FOR DRIVING INSERTS INTO PIECES OF SHEET METAL

BACKGROUND OF THE INVENTION

1. Field of the Invention

The present disclosure is related to the disclosures provided in the following U.S. applications filed concurrently herewith: "A Device For Driving Inserts Into Pieces Of Sheet Metal", filed in the names of M. SCAVINO et al. (U.S. application Ser. No. 08/613,142); and "A Machine And A Method For Driving Inserts Into Pieces Of Sheet Metal", filed in the names of K. ITO et al. (U.S. application Ser. No. 08/613,167); and the disclosures of the aforementioned applications are hereby expressly incorporated by reference herein in their entireties.

The present invention is related to a machine and to a method for driving inserts into pieces of sheet metal.

2. Background and Material Information

In the field of the production of elements formed by bent or pressed metal sheets, there is often a need to form threaded or non-threaded fixing or anchoring points on the internal or external surface of the sheet-metal element. This need arises particularly in the case of aluminum sheets in which it is difficult to produce threaded holes because of the mechanical properties of aluminum.

The inserts are generally formed of metal and are driven into preformed holes in sheets of metal (aluminum, steel or other materials). The inserts may be of various shapes and dimensions according to the function which they are intended to perform. The most common inserts have a hole or a shank which is generally threaded in order to anchor equipment, components and the like to sheet metal, by screwing the equipment, component or the like to the metal sheet via the insert.

A press is normally used to drive the inserts into the preformed holes in the metal sheets. Generally, the press includes a punch and a die which cooperate with one another, and between which a driving zone is defined. The inserts are anchored to the sheet when they are force-fitted into the respective holes in the sheet, so as to bring about plastic deformation of the portion of the metal sheet adjacent the hole into which the insert is force-fitted.

In the machines currently available, the punch and the die cooperate along a vertical driving axis. The press is operated manually by an operator who holds the piece of sheet metal in a horizontal plane during the driving of the inserts, and manually moves the piece after each driving operation.

SUMMARY OF THE INVENTION

An object of the present invention is to provide a machine and a method for driving inserts wherein, unlike conventional machines, the axis along which the inserts are driven is horizontal, and the portion of the piece into which an insert is to be driven is held vertically in the driving zone.

Another object is to provide a vertical arrangement of a piece of sheet metal, into which one or more inserts are to be driven, to considerably simplify automatic handling of the piece, by preventing problems connected with deformations of the piece which can occur due to gravitational effects on a horizontal sheet.

According to the present invention, these objects are achieved by providing a machine, for driving inserts into pieces of sheet metal, which includes a punch and a die which are movable relative to one another along a substantially horizontal axis along which the inserts are to be driven. The punch and the die define a driving zone therebetween. An automatic piece-handling device holds a portion of a piece of sheet metal having a hole into which an insert is to be inserted, in a substantially vertical plane in the driving zone.

The automatic handling device preferably includes a piece-holder head having at least one gripping member for gripping the piece of sheet metal under two different operative conditions. The at least one gripping member holds the piece relatively rigid with respect to the piece-holder head under a first of the two different operative conditions. The at least one gripping member holds the piece in a floating manner with respect to the piece-holder head under a second of the two different operative conditions, so that the piece is free to undergo adjustment movements, relative to the piece-holder head, when the piece is acted upon by external forces.

The piece is free to undergo adjustment movements only in a plane defined by the portion of the piece of sheet metal having a hole into which an insert is to be inserted, relative to the piece-holder head, under the second operative condition.

The machine preferably further includes a locating device for imparting forces to the piece when the piece is held under the second operative condition, to cause the adjustment movements of the piece to align the hole, into which an insert is to be driven, with the axis along which the inserts are to be driven.

The locating device includes a locating pin slidable along the axis along which the inserts are to be driven, and the die includes a hollow body in which the locating pin is slidable. The locating pin projects beyond a distal end of the hollow body in a direction towards the driving zone.

Preferably, the locating device further includes a resilient biasing device for biasing the locating pin, and a stop device. The stop device interacts with the locating pin to control two operative positions of the locating pin. In the first operative position, the stop device locks the locating pin relative to the hollow body. In the second operative position, the stop device enables the locating pin to slide freely in the hollow body against a biasing force of the resilient biasing device.

The stop device preferably further includes a release system which intervenes when the locating pin is subject to an axial force of a magnitude greater than a predetermined value when in the first operative position.

The at least one gripping member of the automatic handling device preferably includes a base, a gripper and a suspension device which connects the gripper to the base. The suspension device permits the adjustment movements of the piece by permitting adjustment movement of gripper in the plane defined by the portion of the piece of sheet metal having a hole into which an insert is to be inserted, when the at least one gripping member is under the first of two different operative conditions.

A locking device connects the gripper rigidly to the base when the at least one gripping member is under the second of two different operative conditions.

The suspension device preferably includes an intermediate element connected to the base by a first four-bar linkage mechanism. The said first four-bar linkage mechanism permits movements of the intermediate element relative to the base in a first direction.

Still further, the suspension device preferably includes a second four-bar linkage mechanism interconnecting the intermediate element and the gripper. The second four-bar linkage permits movements of the gripper relative to the intermediate element in a second direction perpendicular to the first direction.

Further yet, the suspension device preferably includes a resilient member which applies a resilient upward force of adjustable magnitude to the gripper to balance a combined weight of the gripper and of the piece gripped thereby. The gripper is fixed to a plate which is guided in a vertical plane between two flat surfaces fixed to the base of the at least one gripping member.

The locking device includes a locking pin operated by an actuator, and the locking pin is movable perpendicularly to the plate between an inoperative position and a locking position in which the locking pin engages aligned holes in the plate and in the base of the at least one gripping member.

The automatic handling device preferably further includes a carriage movable relative to a stationary base of the machine along a substantially horizontal axis, and a slide which is slidable relative to the carriage along a substantially vertical axis. The slide carries the piece-holder.

The machine according to the present invention further includes a press which carries the punch and the die. The press further includes an actuator for imparting a driving force to the inserts to be inserted. The press is movable relative to the base of the machine along the axis along which the inserts are to be driven. The press further carries a device for automatically supplying inserts to the driving zone. The device for automatically supplying inserts to the driving zone is movable, together with the punch, along the axis along which the inserts are to be driven.

The automatic piece-handling device preferably further carries a store of replacement tools situated in a stationary position on the slide which carries the piece-holder head. The tool store includes a plurality of tool grippers for gripping a set of replacement punches and dies and holding the set of replacement punches and dies in a predetermined position.

The tool grippers have resilient bias devices for biasing the tool grippers toward a closed position. The tool grippers are operable to permit the insertion and removal of a tool as a result of a vertical relative movement between the store and the tool.

A method of driving inserts into pieces of sheet metal includes: providing a punch and a die aligned with one another along a substantially horizontal axis along which the inserts are to be driven; automatically positioning a piece of sheet metal, into which an insert is to be driven, in a substantially vertical plane, using an automatic piece-handling device; automatically aligning a hole in the piece with the axis along which the inserts are to be driven; and forcibly inserting an insert in the hole.

Preferably, the method further includes: preliminarily positioning, prior to automatically aligning, the hole in the piece of sheet metal into which an insert is to be driven, without regard to accuracy, such that there is generally a positioning error between the axis of the hole and axis along which the inserts are to be driven. The automatic aligning includes inserting a locating pin in the hole to force adjustment movements of the piece in directions perpendicular to the axis along which the inserts are to be driven, in order to locate the hole precisely in alignment with the axis along which the inserts are to be driven.

The present disclosure relates to subject matter contained in Italian patent application No. TO95 A 000184 (filed on Mar. 10, 1995) which is expressly incorporated by reference herein in its entirety.

BRIEF DESCRIPTION OF THE DRAWINGS

Further characteristics and advantages of the present invention will become clear in the course of the detailed description which follows purely by way of non-limiting example, with reference to the appended drawings, in which:

FIG. 5 is a partially-sectioned view of the part indicated by the arrow V in FIG. 4, on an enlarged scale;

FIG. 6 is a sectional view taken along the line VI—VI in FIG. 5;

FIGS. 7–11 are sectional view taken along the line VII—VII in FIG. 3 and show the sequence for locating a piece of sheet metal and positioning an insert;

DESCRIPTION OF THE PREFERRED EMBODIMENTS

Figure 1:
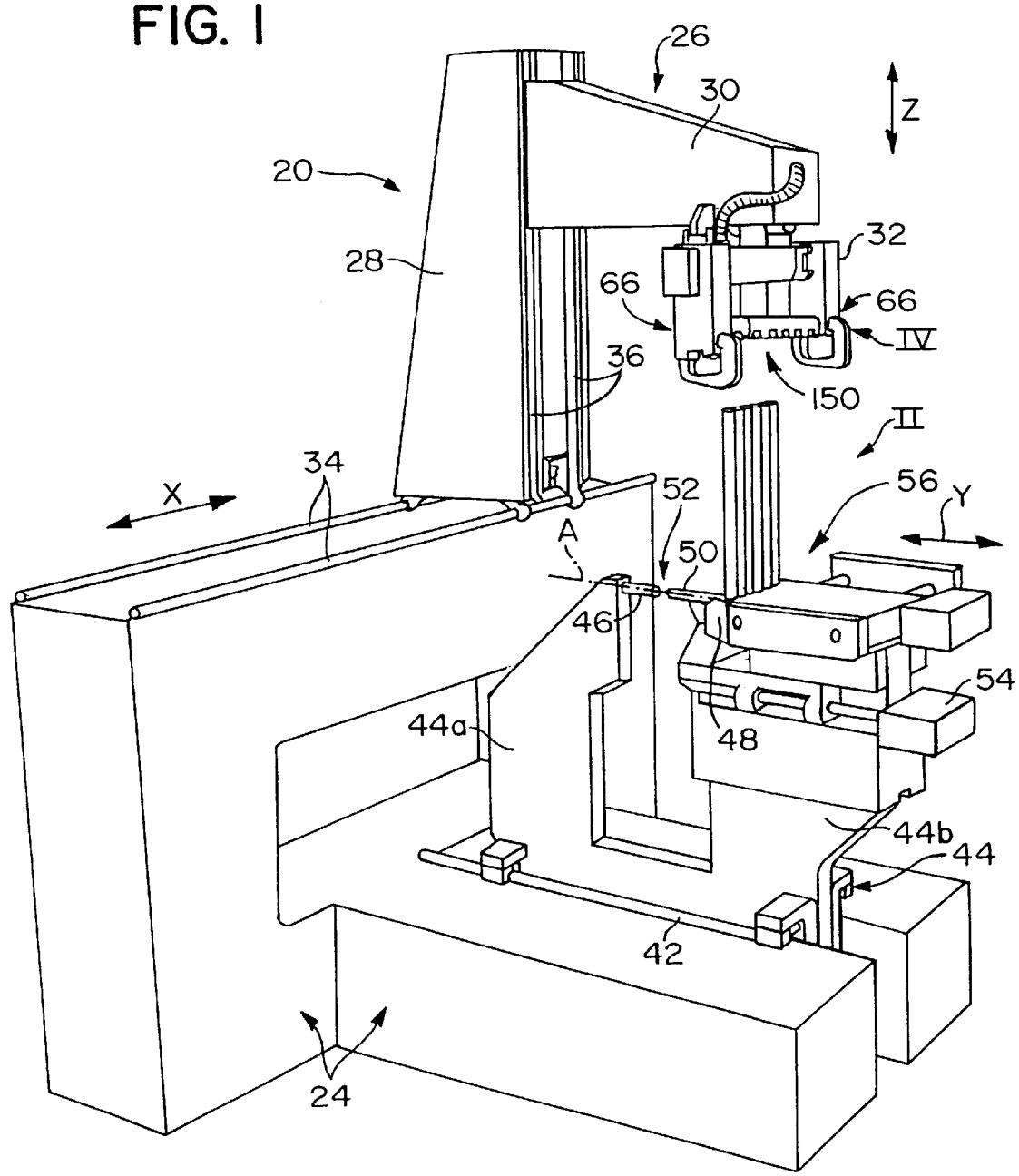
FIG. 1 is a schematic, perspective view of a machine according to the present invention.
Figure 2:
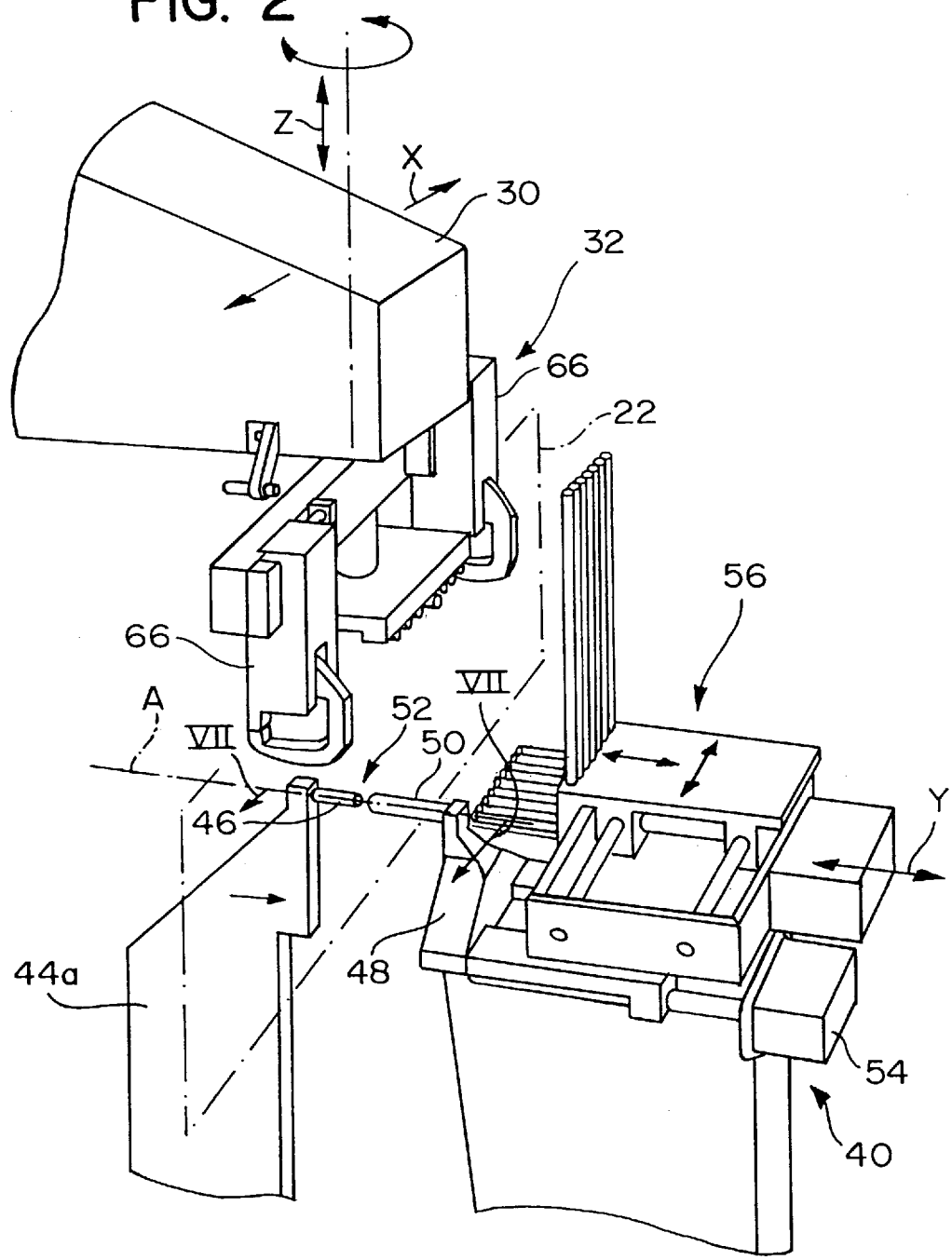
FIG. 2 is a perspective view showing the part indicated by the arrow II in FIG. 1, in greater detail.
Figure 3:
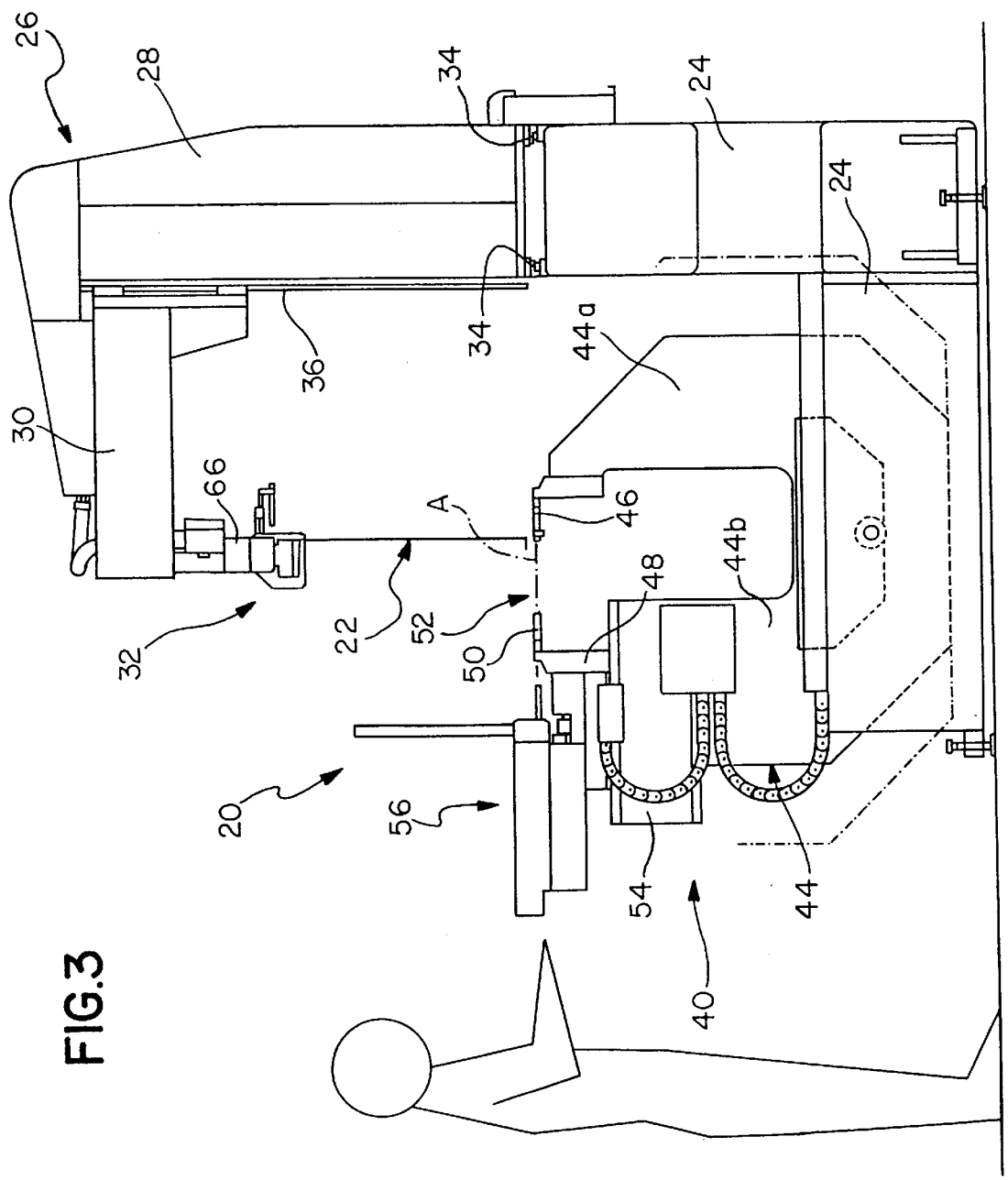
FIG. 3 is a side elevational view of the machine shown in FIG. 1.

Referring now to the drawings in detail, FIG. 1 shows a machine 20 which is designed for driving inserts into pieces of sheet metal 22 (see FIGS. 2 and 3). The machine 20 includes a stationary base 24 on which a piece-holder 26 is slidably mounted. The piece-holder 26 includes a carriage 28, a vertically movable slide 30 and a piece-holder head 32, all of which are movable together along an axis X shown in FIG. 1. The carriage 28 is movable relative to the base 24 along guides 34 to enable the aforementioned movement along the X axis.

The carriage 28 includes guides 36 mounted vertically therealong (i.e., along the "Z axis" shown in FIG. 1). The vertically movable slide 30 is movable relative to the carriage 28 along the guides 36 to enable the vertically movable slide 30 and piece-holder head 32 to move along the Z axis with respect to the base 24.

The base 24 includes guides 42 mounted horizontally therealong (i.e., along the "Y axis" shown in FIG. 1). The machine 20 further includes a press 40 which is movable on the base 24 along the Y axis Y on guides 42. The press 40 has a base structure 44 with a generally U-shaped configuration. A first arm 44a of the base structure 44 carries a die 46, and a second arm 44b carries a slide 48 which is movable relative to the base structure 44 along the Y axis. The slide 48 carries a punch 50 which is aligned with the die 46 on a horizontal axis A which coincides with an axis along which the inserts are to be driven.

The punch 50 and the die 46 define a driving zone 52 therebetween, and a portion of the piece 22 into which an insert is to be driven is positioned therein, as shown by phantom lines in FIG. 2. Referring to FIG. 2, a thrust generator 54 is provided to move the slide 48 along the Y axis and thereby produces the force for driving the inserts. The slide 48 also carries a supply device 56 which is movable along the axis Y together with the punch 50 and which supplies inserts automatically to the driving zone 52.

The supply device 56 is able to automatically supply inserts of different types and sizes to be driven in rapid succession without requiring any down time for retooling, as required by known devices. The structure and the operation of the device 56 for automatically supplying the inserts are described in detail in the application entitled "A Machine And A Method For Driving Inserts Into Pieces Of Sheet Metal", filed in the names of K ITO et al. U.S. application Ser. No. 08/613,167, which has been incorporated by reference above.

As noted above, an important characteristic of the present invention is that, unlike conventional machines, the axis A along which the inserts are driven is horizontal, and the portion of the piece into which an insert is to be driven is held vertically in the driving zone 52. The vertical arrangement of the piece of sheet metal 22 considerably simplifies the automatic handling of the piece, since it prevents problems such as deformations of the piece which can occur from the effects of gravity on a horizontally oriented piece of sheet metal, particularly in the case of metal sheets which do not include stiffening bends.

Figure 4:
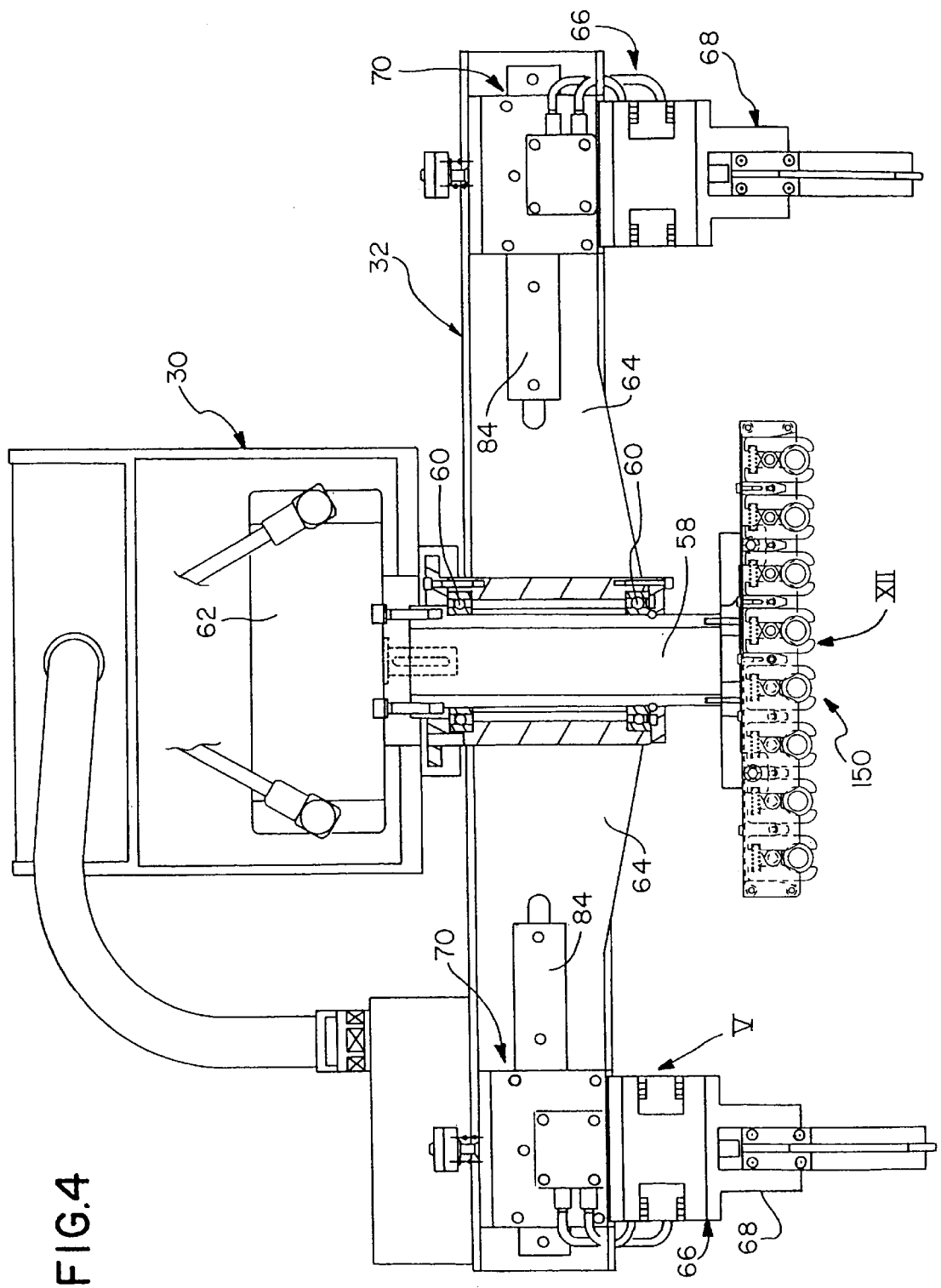
FIG. 4 is a front elevational view of the part of the machine indicated by the arrow IV in FIG. 1, on an enlarged scale.

Referring to FIG. 4, a description of the structure of the piece-holder head 32, which enables pieces of sheet metal to be manipulated vertically, will now be given in detail. A vertical shaft 58 is mounted to the vertically movable slide 30. The piece-holder head 32 is rotatably mounted to the vertical shaft 58 by means of bearings 60. A rotary actuator 62 is provided to rotate the piece-holder head 32 about a vertical axis (i.e., about an axis in the Z direction of FIG. 1).

When an insert is driven into the piece of sheet metal 22, the piece must be perpendicular to the A axis (refer to FIGS. 1 and 2) along which the insert is driven. The actuator rotates the head 32 by an angle of 180° when driving of inserts into opposite surfaces of the piece of sheet metal 22 is required. The rotation of the piece-holder head 32 about the vertical axis also provides greater freedom and convenience during operations of loading and unloading pieces. For example, the piece can be rotated through 90° from the working position by means of a locking device (not shown), in order to reduce obstructions in the zone in which the pieces are loaded and unloaded.

The piece-holder head 32 includes an elongate support element 64 to which are mounted a pair of gripping members 66. As can be seen in greater detail in FIGS. 5 and 6, each gripping member 66 has a gripper 68 which is connected to the support element 64 by means of a suspension device 70. The gripper 68 has a fixed finger 72 and a movable finger 74. The movable finger is driven by a fluid actuator 76. A toggle transmission mechanism 78 of known type is interpositioned between the fluid actuator 76 and movable finger 74, for transmitting a moving force from the fluid actuator 76 to the movable finger 74.

The suspension device 70 of each gripping member 66 is to allow small-magnitude adjustment movements of the gripper 68. In particular, the suspension device 70 permits the small-magnitude adjustment movements solely in the plane of the piece of sheet metal 22.

Referring to FIG. 6, the gripper 68 and actuator 76 are fixed to a plate 80 which is mounted in a groove defined between two elements 82 that form a stationary base of the suspension device 70. The groove defined by the elements 82 permits the plate 80 to make small movements in the plane defined thereby. One of the two elements 82 is connected to the support element 64 through a guide 84, which is mounted in a slot as shown in FIG. 4, to enable the position of the entire gripping member 66 to be varied relative to the support element 64.

As shown in FIG. 5, the suspension device 70 includes an intermediate member 86 which is connected to the base 82 by a first four-bar linkage mechanism 88. The first four-bar linkage mechanism 88 allows the intermediate member 86 to move in a vertical direction (i.e., the "Z axis" direction) with respect to the support element 64 and base 82. The plate 80, which is fixed with respect to the gripper 68, is connected to the intermediate member 86 by a second four-bar linkage mechanism 90. The second four-bar linkage mechanism allows the plate 80 to move in a horizontal direction (i.e., the "X axis" direction) with respect to the intermediate member 86.

The suspension device 70 further includes a resilient member 92. The resilient member includes a threaded rod 94 which is fixed to the intermediate member 86. A helical compression spring 100 surrounds the threaded rod 94 and seats on a preformed portion of the base 82. A plate 98 is screwed over the top end of the helical compression spring and acts as a bearing surface therefor. The spring 100 applies an upward force to the gripper 68, through the intermediate member 86 and the four-bar linkage mechanism 90. The upward force applied by the spring 100 balances the weight of the gripper 68 and of the piece 22 gripped thereby. The magnitude of the balancing force provided by the suspension device 70 can be adjusted in accordance with the weight of the piece of sheet metal to be carried by screwing or unscrewing the plate 98, thereby varying the force applied by the compression spring 100.

In FIG. 5, a screw, indicated 95, fixed to the intermediate member 86, functions as an index associated with a graduated scale, to enable the balancing load to be set according to the weight of the piece to be handled.

The configuration of gripping member 66 carries the gripper 68, with regard to the support element 64, in a manner such that the gripper 68 floats freely in the plane of the piece to be handled. This floating ability is very useful for carrying out precise positioning of the hole into which an insert is to be driven, relative to the axis A along which the inserts are driven. The procedure for precise alignment of the hole in the piece with the A axis will be described in detail below.

Although the free floating ability of the gripper 68 and the piece carried thereby, which is enabled by the suspension system 70 is very useful during the location of the piece, such free floating ability would actually be counterproductive during transfer and handling operations of the piece. In fact, the ideal arrangement would provide a rigid connection between the piece and the piece-holder head 32 during operations of positioning and transferring the piece of sheet metal 22, but to provide a free floating ability for carrying the piece during locating operations and during the driving of the inserts.

In order to satisfy these requirements, each gripping member 66 is provided with a locking device which locks the gripping member with respect to the piece-holder head, by forming a rigid connection between the gripper 68 and the support element 64, rendering the suspension device 70 inoperative.

As shown in FIG. 6, a locking device is formed by providing a locking pin 102 connected to a piston 104 which is movable under the action of compressed air in a cavity 106. The locking pin 102 is thus movable between an inoperative position, in which the gripper 68 is free to perform the adjustment movements permitted by the four-bar linkage mechanisms 88 and 90, and an operative, locking position, in which the pin 102 engages a hole 108 in the pivoting plate 80 and a hole 110 in the base 82. In the locking condition, the plate 80 is thus fixed to the base 82.

The method by which the piece of sheet metal is located for driving an insert will now be described with reference to FIGS. 7 through 11.

In FIG. 7, the piece 22 is held in a vertical position in the driving zone 52 defined between the punch 50 and the die 46. The punch 50 has an axial cavity 112 through which inserts 114 are fed in succession, to perform a succession of insert operations in a plurality of holes. The characteristics of the punch 50 and its operation are described in detail in the application entitled "A Device For Driving Inserts Into Pieces Of Sheet Metal", filed in the names of M. SCAVINO et al. U.S. application Ser. No. 08/613,142, which has been incorporated by reference above.

The die 46 has a hollow body 118 in which a locating pin 116 is housed. The locating pin 116 is movable in the hollow body 118 along the axis A. The locating pin 116 is biased by a weak helical compression spring 120, so that when no forces are acting on the tip of the pin 116 which is not in contact with the spring 120, the tip of the locating pin 116 projects from the distal end of the body 118. The locating pin 116 is fixed to a rod 122 which projects from the end of the body 118 opposite of the end from which the tip of the locating pin projects. The rod 122 cooperates with a locking device 124 for locking the position of the locating pin 116.

The locking device includes a piston 126 which is vertically movable in a pneumatic chamber 128. A retaining member 130 articulates about a point 132 and cooperates with the upper end of the piston 126 and the projecting end of the rod 122. A ball 134, or similar engagement element, is urged by a spring 136 into engagement with a recess 138 in the retaining member 130. The retaining member 130 also has a projecting pin 140 for cooperating with a surface 142 in order to automatically carry out a resetting operation as will be described below.

To perform a locating operation, the piece-holder 32 preliminarily positions the piece 22 in the driving zone 52 so that the axis of the hole 144 into which the insert 114 is to be driven is substantially aligned with the driving axis A. During the transfer of piece 22, the piece-holder head 32 is kept in the rigid configuration to prevent the piece 22 from floating. During the preliminary positioning, there is no need for great precision, since the locating system corrects positioning errors up to a certain magnitude. Since it is not necessary to position the axis of the hole 144 with great accuracy on the axis A during preliminary positioning, the system for moving and controlling the piece-holder head 32 can be greatly simplified, and the speed with which a preliminary positioning can be performed is greatly increased.

After the preliminary positioning of the piece 22 has been carried out, the locking pins 102 are moved to the inoperative position, so that the grippers 68, and thus the piece 22, are rendered free-floating and enabled to perform adjustment movements permitted by the four-bar linkage mechanisms 88 and 90, in the plane of the piece 22, under the action of external forces.

As shown in FIG. 8, the punch 50 and the die 46 are next moved close together. During this movement, the retaining member 130 is in the position of engagement with the rod 122. Thus, the locating pin 116 is locked relative to the body 118 and can therefor apply forces to the piece 22 to adjust the piece 22 for more accurate alignment of the hole 144 with the axis A, i.e., to align the hole 144 so that its center aligns with axis A. These adjustment movements compensate for a certain amount of location error that may occur during the preliminary positioning of the piece. When the locating pin 116 has inserted into the hole 144 to an extent where the largest diameter of the pin extends through the hole 144, the axis (i.e., center) of the hole 144 will be located precisely on the axis A along which the inserts are driven.

FIG. 9 shows an example where, due to an operating anomaly, the hole 144 has been preliminarily positioned out of an alignment by a margin of error which is too large for the locating system to correct. In such a situation, the tip of the locating pin 116 misses the hole 144 entirely and makes contact with the surface of the sheet 22. The contact between the tip of the locating pin 116 and the sheet 22 causes a thrust force to be transferred to the contact between the protruding end of rod 122 and retaining member 130. The magnitude of the thrust force transferred in this case is greater than a calibrated level up to which the ball 134 holds the retaining member 130 in position. Consequently, the thrust force from the locating pin 116 causes the retaining member 130 to rotate away from the rod 122, as shown in FIG. 9. As a result of this rotation, pin 140 engages the surface 142 and is biased thereby to store potential energy.

The locating pin then retracts into the die 46, thereby preventing damage to the piece of sheet metal 22. Indicator means may be provided to alert the operator that an anomalous event has occurred. After the anomaly shown in FIG. 9 has been corrected, the retaining member 130 returns to the normal operating position in contact with the rod 122 as soon as the pin 116 is free to protrude from the die once again. The piston 126 moves downwardly under the action of a spring 146 and the potential energy stored in the pin 140 is converted to kinetic energy to rotate the retaining member 130 back to its starting position in contact with the rod 122.

Under normal operating conditions, after the locating pin 116 has been correctly inserted in the hole 144, a thrust rod 148 then urges an insert 114 the supply duct 112, as shown in FIG. 10. The thrust rod 148 moves the insert 114 into the driving zone 52 where the insert contacts the locating pin 116, and thus is gripped between the thrust rod 148 and the locating pin 116.

The locking device 124 is then brought to the inoperative position by moving the piston downward into the pneumatic chamber 128, thereby allowing the locating pin 116 to slide against the biasing force of the spring 120. As shown in FIG. 11, the locating pin 116 is then is urged into the hollow body 118 by the force of the insert 114, as the insert is into the hole 144 by the thrust rod 148. A driving force is then applied to the insert by means of the punch 50 in the manner described in detail in the application entitled "A Device For Driving Inserts Into Pieces of Sheet Metal", filed in the names of M. SCAVINO et al. U.S. application Ser. No. 08/613,142, which has been incorporated by reference above.

Figure 12:
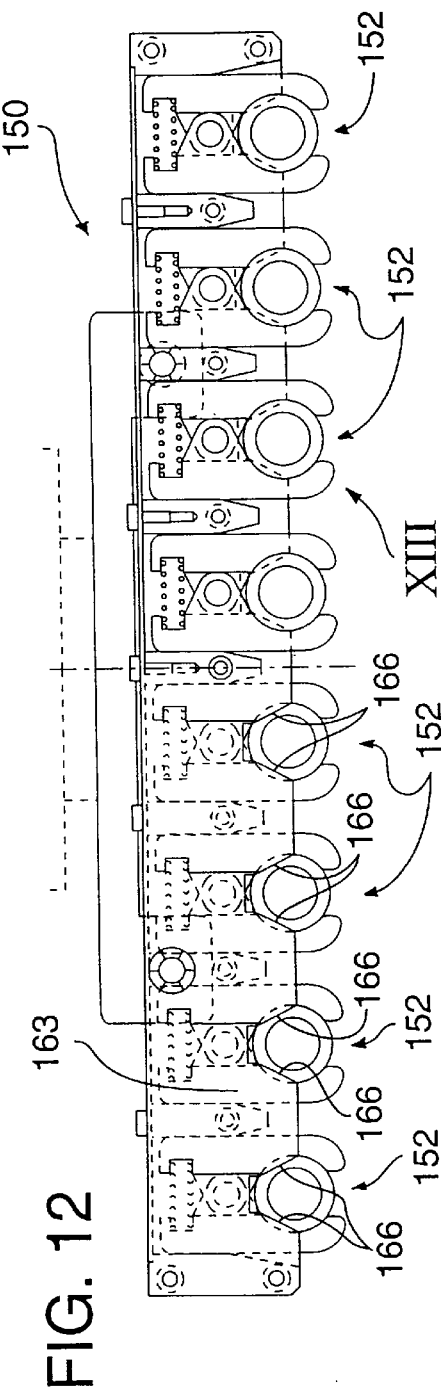
FIG. 12 is a front elevational view of the part indicated by the arrow XII in FIG. 4, on an enlarged scale.
Figure 13:
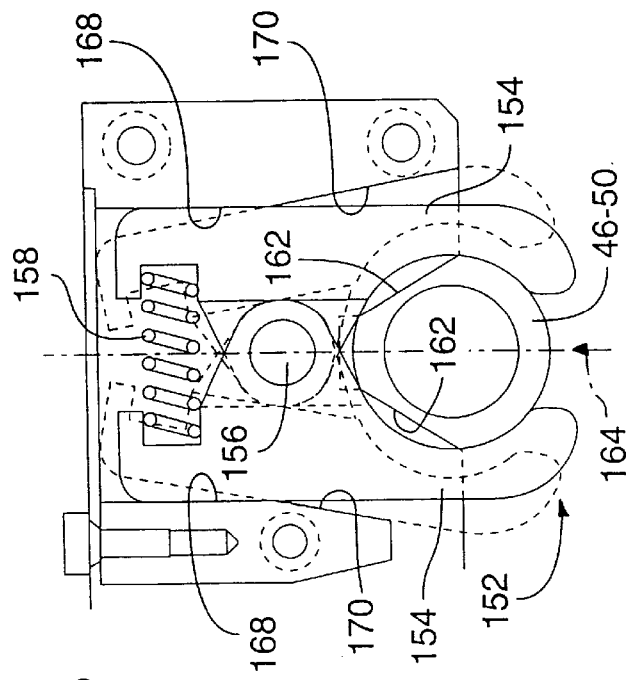
FIG. 13 is a view of the part indicated by the arrow XIII in FIG. 12, on an enlarged scale.

Referring again to FIG. 4, the vertically movable slide 30 also carries a store of replacement tools 150. The store 150 is mounted to the vertical shaft 58. As shown in greater detail in FIGS. 12 and 13, the tool-holder store 150 includes a plurality of grippers 152. Grippers 152 are passively actuated and thus do not require an active actuator to perform opening and closing operations. Rather, each gripper 152 comprises a pair of jaws 154 articulated to one another on a fixed pin 156. A helical compression spring 158 is provided in each gripper to bias the jaws 154 to the closed position.

Each punch 50 or die 46 has an engagement portion adapted to be gripped by the grippers 152. The outer surface of each engagement portion is shaped to have inclined surfaces 162 which, when they are inserted between the jaws 154 by the movement indicated by the arrow 164, cause the jaws to open against the action of the spring 158. The jaws 154 are guided between a pair of plates 163, only one of which is visible in the left-hand portion of FIG. 12. The plates 163 have locating surfaces 166 against which the inclined surfaces 162 of a punch 50 or die 46 bear to maintain a predetermined orientation of the tool (i.e., punch or die) relative to the gripper. The tool 46, 50 is removed from the respective gripper 152 by a relative movement in the opposite direction to that indicated by the arrow 164.

The jaws 154 are disposed between stationary surfaces 168 and 170 which limit the movements of the jaws and thus define the extreme open position of the grippers. As noted above, since the grippers 152 are passive, they do not require actuator means.

The machine according to the present invention can replace the tools automatically. Replacement of the tools becomes necessary, for example, when the type of insert to be driven requires a punch and die of different dimensions, or when a tool becomes dull, worn or breaks.

In order to replace the tools automatically, the carriage 28 is moved in the X axis direction to move the store 150 to align a free pair of grippers 152 with the punch 50 and the die 46 which are in use by the machine. The slide 30 and store 150 are then moved in the Z axis direction to move the free grippers into engagement with the tools. The tools are thus disengaged from their seats on the base structure as they are grasped by the grippers and the store 150 is repositioned by movement along the Z direction and then the X direction to align the grippers holding the punch 50-die 46 pair which are desired to be used, with the seats in the structure 44 for attachment thereto. The new punch 50-die 46 pair is removed from the store by the raising of the store, after the tools have been gripped by rapid attachment means of the press (on the structure 44). This operation can alternatively be carried out in order to replace only one of the punch 50 and die 46.

Although the invention has been described with reference to particular means, materials and embodiments, it is to be understood that the invention is not limited to the particulars disclosed and extends to all equivalents within the scope of the claims.

What is claimed:

1. A machine for driving inserts into pieces of sheet metal, comprising:
    a punch and a die which are movable relative to one another along a substantially horizontal axis along which inserts are to be driven, wherein said punch and said die define a driving zone therebetween;
    a slidable support;
    a piece-holder head rotably attached to said slidable support and having at least one gripping member for gripping the piece of sheet metal under two different operative conditions;
    means for moving said at least one gripping member relative to said piece-holder head, such that said at least one gripping member holds the piece of sheet metal in a floating manner with respect to said piece-holder head under a first of said two different operative positions, so that the piece is free to undergo adjustment movements, relative to said piece-holder head, when the piece is acted upon by an external force;
    means for locking said at least one gripping member relative to said piece-holder head, such that said at least one gripping member holds the piece relatively rigid with respect to said piece-holder head under a second of said two operative conditions, so that said punch and die can cooperate to drive an insert into the hole in the piece of sheet metal; and
    a locating means for imparting an external force to the piece when the piece is held under the first operative condition, to cause the adjustment movements of the piece to align the hole, into which an insert is to be driven, with the axis along which the inserts are to be driven.

2. The machine according to claim 1, wherein the piece is free to undergo adjustment movements only in a plane defined by the portion of the piece of sheet metal having a hole into which an insert is to be inserted, relative to said piece-holder head, under said first operative condition.

3. The machine according to claim 2, wherein said at least one gripping member comprises:
    a base;
    a gripper;
    a suspension device connecting said gripper to said base; wherein said suspension device permits said adjustment movements of the piece by permitting adjustment movement of said gripper in said plane defined by the portion of the piece of sheet metal having a hole into which an insert is to be inserted, when said at least one gripping member is under said first of said two different operative conditions; and
    a locking device which connects said gripper rigidly to said base when said at least one gripping member is under said second of said two different operative conditions.

4. The machine according to claim 3, wherein said suspension device comprises
    an intermediate element connected to said base by a first four-bar linkage mechanism, wherein said first four-bar linkage mechanism permits movements of said intermediate element relative to said base in a first direction; and
    a second four-bar linkage mechanism interconnecting said intermediate element and said gripper, wherein said second four-bar linkage permits movements of said gripper relative to said intermediate element in a second direction perpendicular to said first direction.

5. The machine according to claim 4, wherein said gripper is fixed to a plate which is guided in a vertical plane between two flat surfaces fixed to said base of said at least one gripping member; and
    wherein said locking device comprises a locking pin operated by an actuator, said locking pin being movable perpendicularly to said plate between an inoperative position and a locking position in which said locking pin engages aligned holes in said plate and in said base of said at least one gripping member.

6. The machine according to claim 3, wherein said suspension device comprises:
    a resilient member which applies a resilient upward force of adjustable magnitude to said gripper to balance a combined weight of said gripper and of the piece gripped thereby.

7. The machine according to claim 1, wherein said locating means comprises:
    a locating pin slidable along the axis along which the inserts are to be driven, wherein said die comprises a hollow body in which said locating pin is slidable, and wherein said locating pin projects beyond a distal end of said hollow body in a direction towards said driving zone.

8. The machine according to claim 7, wherein said locating means further comprises:
    a resilient biasing device which biases said locating pin; and
    a stop device, wherein said stop device interacts with said locating pin to control two operative positions of said locating pin;

wherein said stop device locks said locating pin relative to said hollow body in the second of said two operative positions; and wherein said stop device enables said locating pin to slide freely in said hollow body against a biasing force of said resilient biasing device, in the first of said two operative positions.

9. The machine according to claim 8, wherein said stop device comprises a release system which intervenes when said locating pin is subject to an axial force of a magnitude greater than a predetermined value when in said second operative position.

10. The machine according to claim 1, wherein said slidable support further comprises:

a carriage movable relative to a stationary base of the machine along a substantially horizontal axis; and a slide which is slidable relative to said carriage along a substantially vertical axis, wherein said slide carries said piece-holder.

11. The machine according to claim 10, further comprising:

a press carrying said punch and said die, said press further comprising an actuator for imparting a driving force to the inserts to be inserted, said press being movable relative to said base of the machine along said axis along which the inserts are to be driven.

12. The machine according to claim 11, wherein said press further carries a means for automatically supplying inserts to said driving zone, said means for automatically supplying inserts to said driving zone being movable, together with said punch, along said axis along which the inserts are to be driven.

13. The machine according to claim 10, wherein said slidable support carries a store of replacement tools situated in a stationary position on said slide which carries said piece-holder head.

14. The machine according to claim 13, wherein said tool store comprises a plurality of tool grippers which grip a set of replacement punches and dies and which hold said set of replacement punches and dies in a predetermined position;

wherein said tool grippers comprise resilient bias devices which bias said tool grippers toward a closed position; and wherein said tool grippers are operable to permit the insertion and removal of a tool as a result of a vertical relative movement between said store and the tool.

\* \* \* \* \*